Dec. 16, 1969 W. PARKS III, ETAL 3,484,588
PLANE TYPE LINE SCANNER FOR UNIVERSAL INFORMATION SYSTEM
Filed Oct. 9, 1964 5 Sheets-Sheet 1

INVENTOR
WILLIAM PARKS III, FREDERICK JONKER

INVENTOR
WILLIAM PARKS, III FREDERICK JONKER

INVENTOR
WILLIAM PARKS III, FREDERICK JONKER

INVENTOR
WILLIAM PARKS III, FREDERICK JONKER

United States Patent Office 3,484,588
Patented Dec. 16, 1969

3,484,588
PLANE TYPE LINE SCANNER FOR UNIVERSAL
INFORMATION SYSTEM
William Parks III, Silver Spring, Md., and Frederick
Jonker, Washington, D.C., assignors to Jonker Business
Machines, Inc., a corporation of Delaware
Filed Oct. 9, 1964, Ser. No. 402,832
Int. Cl. G06k 7/00; G01n 21/30
U.S. Cl. 235—61.11                                       2 Claims

ABSTRACT OF THE DISCLOSURE

Apparatus for reading information from data cards for the peek-a-boo type having light-discriminatable spots at selected column-and-row intersections of a predetermined coordinate matrix of spot positions. A linear assembly of light sensors, corresponding to the totality of spot positions in a single row or column of the matrix, is provided, together with motor means for producing a relative scanning motion of said array with respect to a card holder, or vice versa, to accomplish sequential scanning of the information spots in each row (or column) of the matrix. To remove the limitation imposed by low speed of response of the sensors, they are connected in groups with an enabling circuit common to each group, and read-out circuits common to corresponding sensors throughout the groups, and means are included to energize said enabling circuits sequentially and in timed relation to the scan drive of the motor means.

OUTLINE OF INVENTION AS PART OF SUPERIMPOSABLE TERMCARD SYSTEM

Figure 1:
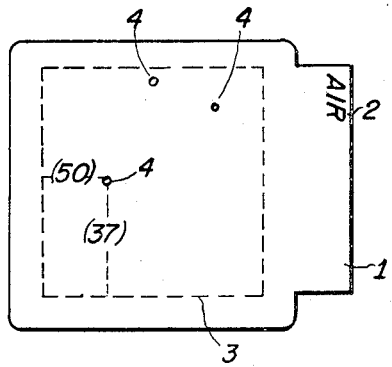

This invention pertains to information retrieval systems based on the use of superimposable cards dedicated to terms and the determination of coincidence of holes in said cards. These systems are also known as peek-a-boo systems. Commercially they are known as Termatrex systems.

In the Termatrex systems, an item of information is prepared for entry into the system by first indexing it by a number of terms taken from a vocabutary of terms. Each item of information is also given an accession number.

Termatrex system comprised of a number of cards each dedicated to a term. In total there will genertlly be a vocabulary of between 500 and 5000 terms. On each term card is a place (or a combination of places) dedicated to each item of information in the collection. Each item has the same positions dedicated to it on each term card. Generally there are 10,000 dedicated positions on the term cards arranged in a matrix of 100 × 100 positions.

Items of information are entered into a Termatrix system by selecting all of the terms cards by which that item has been indexed, placing these cards in superimposition in a Termatrex machine and drilling one or more holes in all of these cards simultaneously at the position dedicated to that item of information.

The system is seached by selecting a number of term cards together describing a search question, and placing these in superimposition in a Termatrex machine. Next, a light in the bottom of the Termatrex machine is turned on, making coinciding holes in these term cards visible as light dots. The serial number of these light dots can then be read off one by one, for example, by means of a transparent grid with an X–Y coordinate system on it.

Generally, only one position is dedicated to each document. The serial number of the document could the correspond to the X–Y coordinates of that position. For example, document #2515 would have its position at a location with 25 as the Y coordinate and 15 as the X coordinate.

A device to enter data into superimposable cards has been disclosed in U.S. Patent No. 3,052,150. It is suited for data entry purposes as well as for search purposes. The devices and methods involved in the use of these records are all well-known in the art, and no claim is laid thereto here with exception of the automatic scanner described here.

Sometimes this equipment is used for the collection of statistical data. In that case, a number of term cards are placed in superimposition in the machine and the number of coinciding holes are counted.

The present invention describes a novel type of flying spot scanner that can be used for that purpose. It will also be able to read off the coordinate positions corresponding to the document numbers and transfer the same to punched cards, printed paper tape or any other suitable storage medium.

It is, of course, possible to use a cathode ray tube as a flying spot scanner. These are extremely fast. However, they are very expensive and electronically quite complex.

Moreover, the extremely high speeds possible with C.R.T. flying spot scanners are not needed. A scan time of 10–20 seconds for cards having 10,000 positions would be more than adequate.

Instead of a C.R.T., a matrix of individual bulbs could be used. However, with a position spacing on the term cards of 10–12 positions to the inch, as is commercial practice, this becomes not too practical.

In view of these and other considerations, the device is based on a row of light sensors across which the superimposed cards are moved or vice versa. The row of light sensors is scanned electronically. This will provide the necessary speed. At the same time it will be possible to stop the scan for the automatic recording of the coordinates of coincident holes in a punched card. The line by line movement of the cards is performed by a servomechanism. It can be stopped to allow a punch card perforator or other output device to record the address.

FIGURE 1 shows a Termatrex card dedicated to the term "air." Numeral 2 designates the term "air" marked on the card. The area 3 contains the positions dedicated to documents that may be perforated. Numerals 4 designate perforated positions. Based on the matrix of 10,000 positions, hole 5 having 50 and 37 as X and Y coordinates respectively is dedicated to document 3750 or "item" 3750. However, other ways of correlating position and document number are possible, and it is also possible to identify documents by a combination of positions instead of one.

OUTLINE OF INVENTION AS PART OF ITEM CARD SYSTEM

It is part of the invention that the scanner can be used as part of a universal information system. This means that the invention can be used either as part of a term record system or as part of an item record system. In a term record system each record represents a term, and items are recorded by making a hole in the term record. In an item record system each record represents an item and terms are recorded by making a hole in the item record. Positions on the cards are dedicated to terms. On every card, the same position is dedicated to the same term. Presence of a hole indicates that the item is characterized by that term.

The form of the card used as the record is the same for either system.

Data that are to be entered into a computer or other equipment must first be put into machine language. At present this is usually accomplished by arranging the data on posting sheets which are then edited to eliminate coding errors and omissions. The posting sheets are then used by skilled keypunch operators for keyboard entry into punched cards.

The punched cards thus generated are then usually verified to eliminate keypunch operator errors in the well-known manner. After the cards have been keypunched, the original data is again entered into the keyboard of a machine designed to simultaneously compare the punched card data with the data being entered into the keyboard, and to signal the operator when a discrepancy is found. The cost of keying in the data twice is considerable.

However, according to the invention each individual generating data can be supplied with a simple, inexpensive "encoder" with which the data are directly entered into machine readable item records. The scanner described in this invention can then be used to automatically scan these item records and record the coordinates of the holes in regular punched cards. The entry of data through the encoder-scanner system will also eliminate the need for verification. The encoder is extremely inexpensive and no skill is required in its use. Moreover, entering the data into item records by means of the encoder is not harder than the preparation of the handwritten records from which the card punch posting sheets are made.

Since the data input into the computer or other equipment is the greatest data processing bottleneck, this invention represents a considerable contribution to the art.

Figure 2:
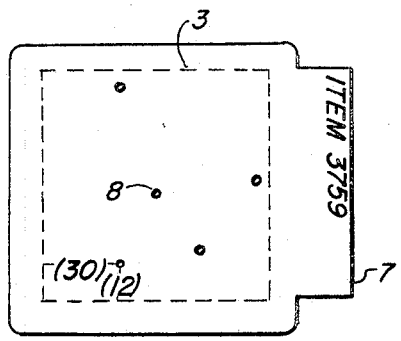
Figure 3:
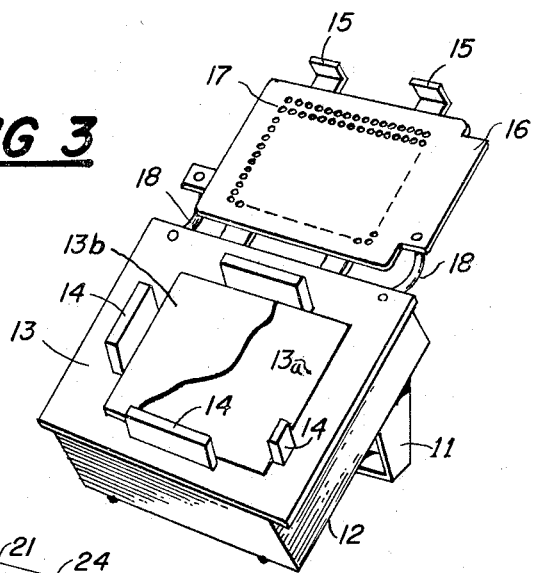
Figure 4:
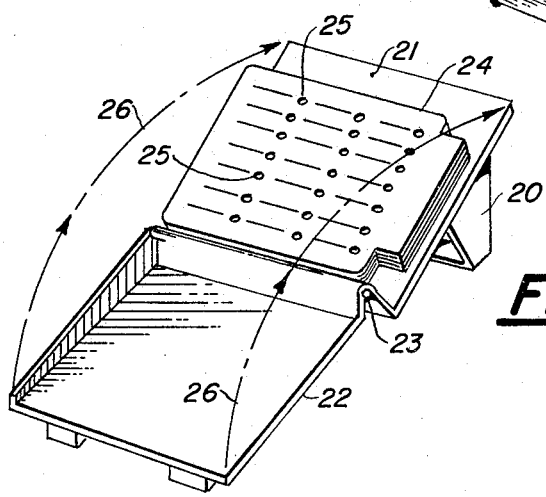
Figure 5:
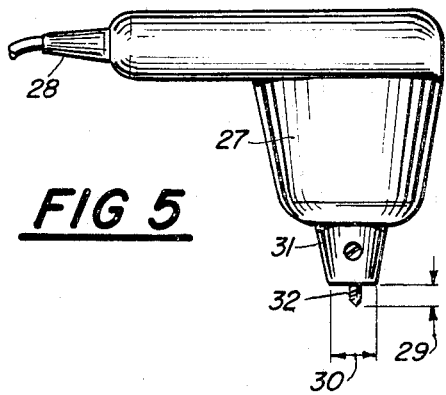
Figure 6:
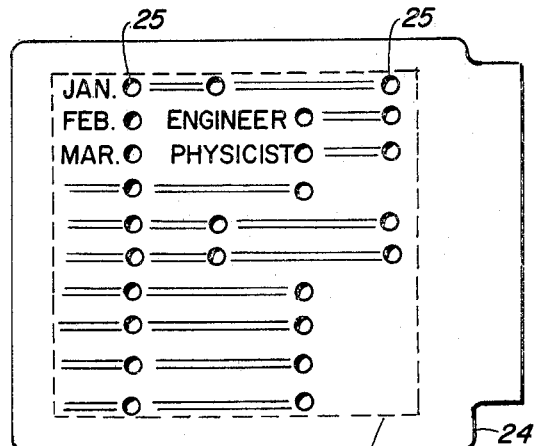
Figure 7:
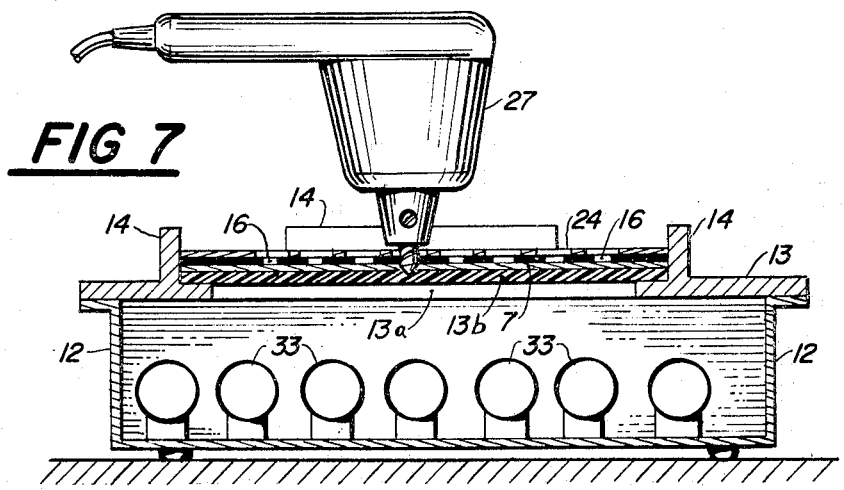
Figure 8:
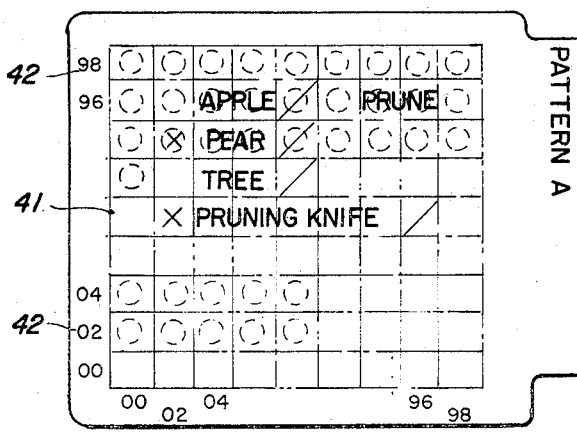
Figure 9:
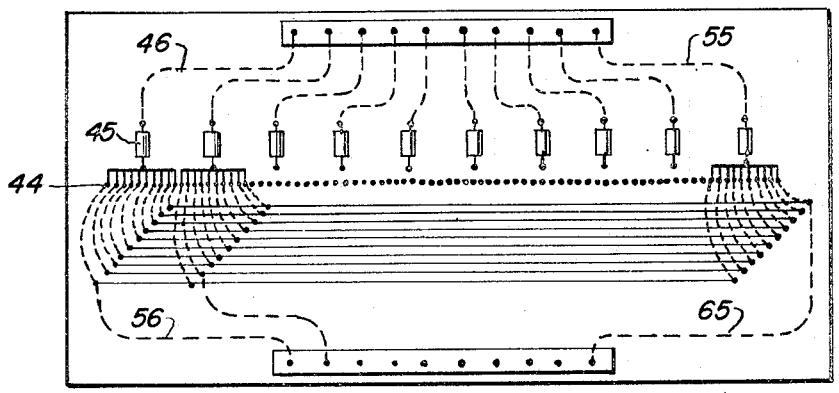
Figure 10:
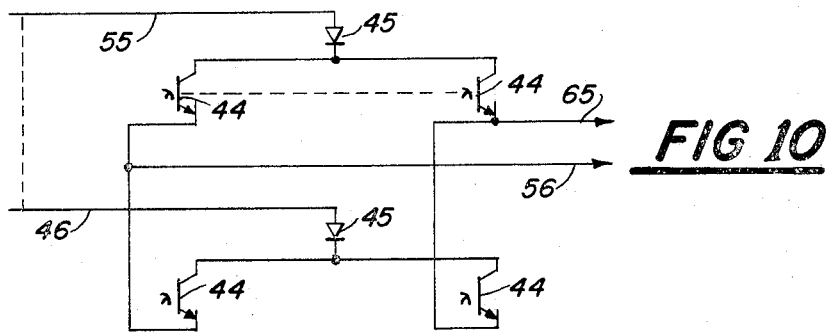
Figure 11:
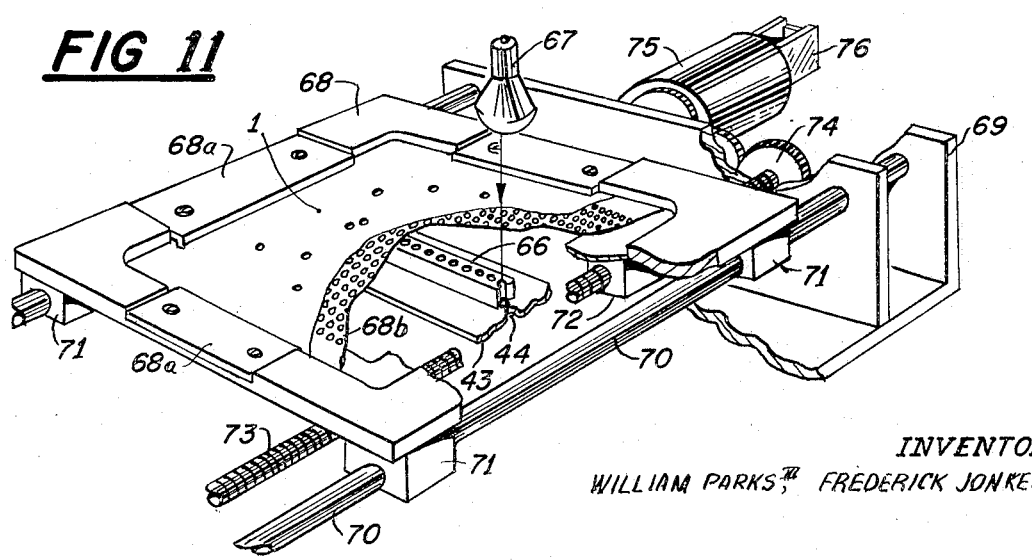
Figure 12:
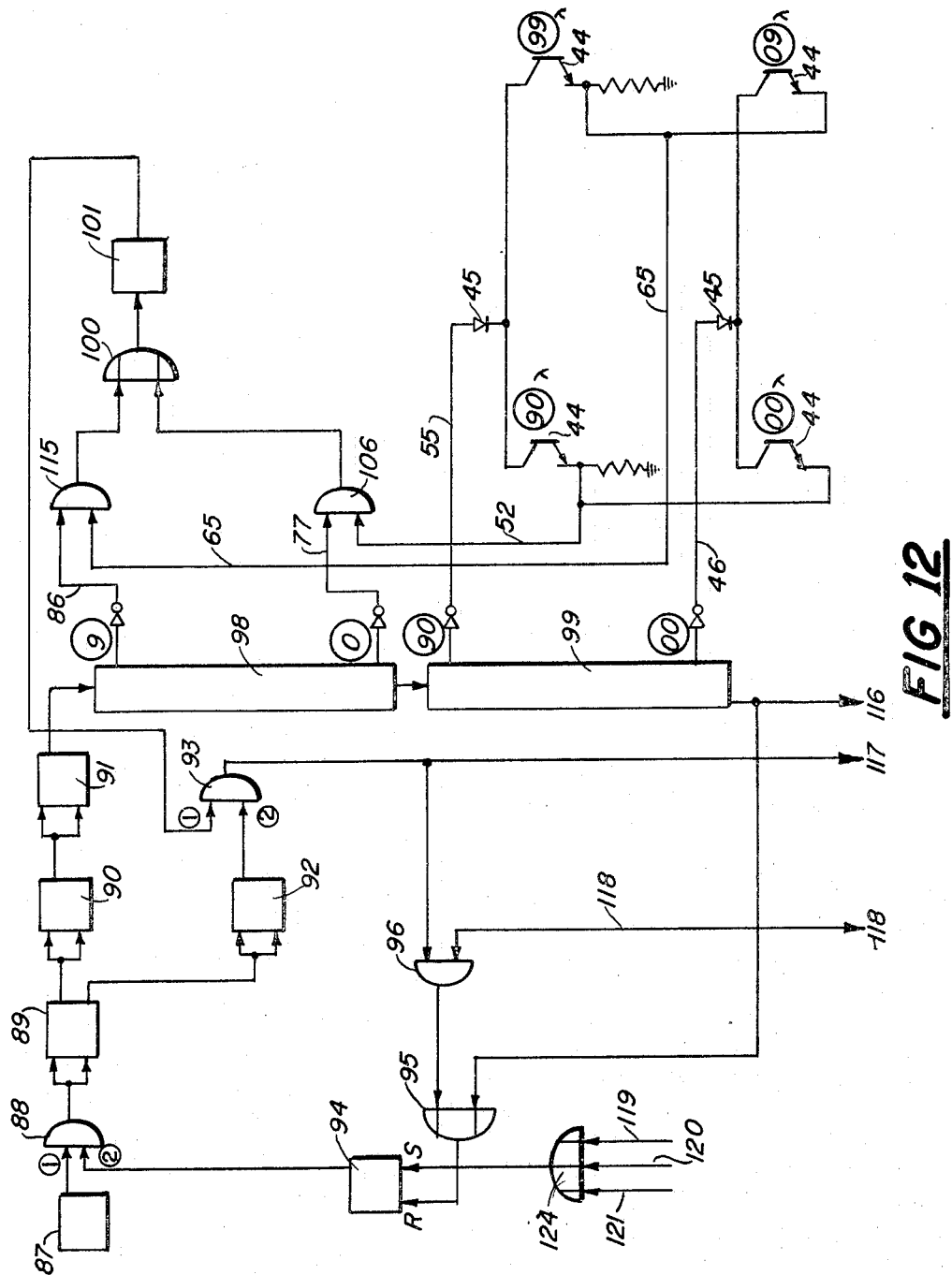
Figure 13:
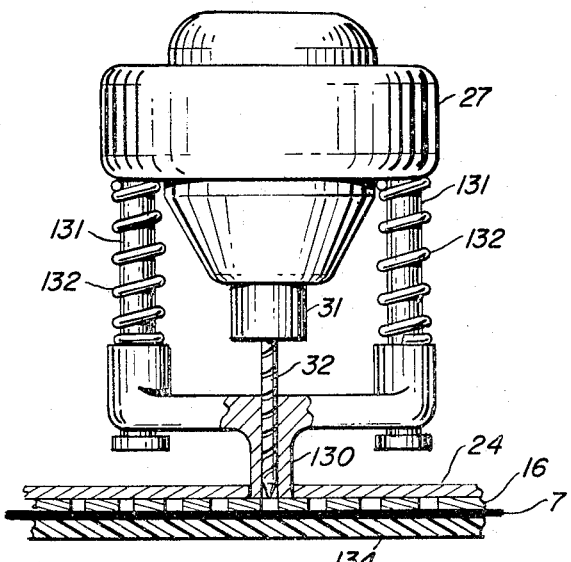
Figure 14:
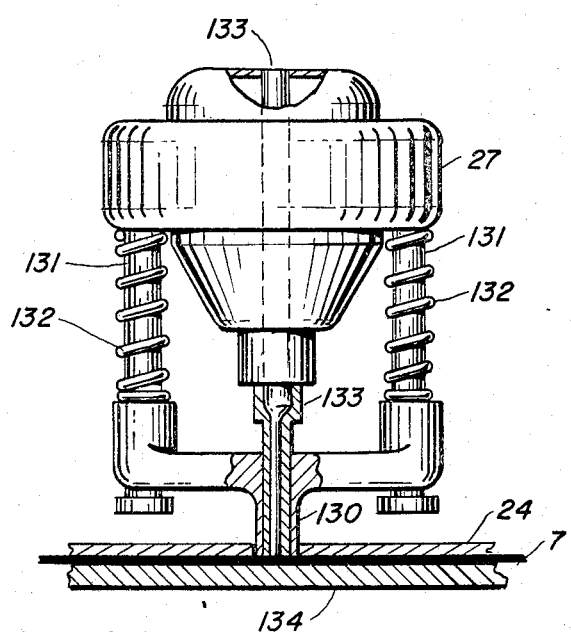

The invention will now be explained by means of the following figures:

FIGURE 1 shows a record card used as a term record.
FIGURE 2 shows the same card used as an item record.
FIGURE 3 shows the encoder.
FIGURE 4 shows the vocabulary cards and the stand for the same.
FIGURE 5 shows the data entry drill.
FIGURE 6 shows a vocabulary card.
FIGURE 7 shows a cross section of the encoder.
FIGURE 8 shows the term assignment record.
FIGURE 9 shows the light sensor printed circuit board.
FIGURE 10 shows the schematic of the light sensor board.
FIGURE 11 shows an isometric view of the invention.
FIGURE 12 shows a block diagram of the invention.
FIGURES 13 and 14 show modifications of the encoder of FIGURES 3 and 7.

FIGURE 1 shows a card 1 according to the invention, when used as a term card dedicated to the term "air" shown at numeral 2. Numeral 3 designates the coding area of, for example, 100×100 positions. Numerals 4 represent marks, generally holes. Hole 5 represents item #3750.

FIGURE 2 shows a card 7 according to the invention, when used as an item card dedicated to item #3750. Hole number 8 representing position 1230, corresponding to a term, for example, the term "air."

USE OF THE INVENTION AS AN ITEM CARD SYSTEM

FIGURES 3, 4 and 5 show the encoder system used to enter data into item records. FIGURE 3 shows a view of the encoder 11. FIGURE 7 shows a cross section of part of it. It comprises a top plate 13 having a number of alignment blocs 14 to align the item record 7 to be placed within these alignment blocs. A square opening 13a covered by a translucent plate 13b corresponds to the area 3 in card 7 in which the data are entered. A light box 12 mounted behind opening 13a exposes this area to an even source of light mounted in this light box such as a bank of fluorescent tubes 33 in FIGURE 7. Mounted on top of top plate 13, fitting accurately between alignment blocs 14 is a translucent backup plate 13b, shown partially cut away.

On two extensions of top plate 15 rests a drill template 16 having the same shape as the item records. If the system is based on a pattern of 100×100 positions, the drill template 16 will have 10,000 premade holes at these positions. As shown in FIGURE 3, the template could be attached to top plate 13 by means of flexible wires 18 or some other suitable means, which allows it to swing back and forth easily and can yet not be removed or put into the encoder in the wrong position.

In order that the operator can easily find the hole position corresponding to a certain term, a number of encoding overlays 24 are provided. One is shown in FIGURE 6. They have been provided with holes 25 and the terms corresponding to these holes have been printed next to each hole. The overlays 24 are kept in an overlay holder 20 comprising sections 21 and 22 connected by a hinge 23.

To encode an item, the operator goes through the encoding overlays 24, taking them one by one from section 21, flipping them over and dropping them in section 22. Thus the operator can review the entire vocabulary of terms and pick out the overlays he needs and by means of these drill the holes corresponding to the terms he selects. After completion of the entry of the item, all overlays can be replaced in section 21, by tilting section 22 as shown by the dashed arrows.

In using this system, an item record 7 is placed in the encoder. The drill template is placed on top of it. On top of that goes an overlay 24. Data are then entered by means of hand drill 27 shown in FIGURE 5. The twist drill will have a free length 29 slightly less than the combined thickness of overlay 24, template 16, record 7 and backup plate 13b. The drill will be advanced until the collar of the chuck 31 contacts the overlay 24.

A practical hole pattern will have 10 or 12 positions to the inch. The Termatrex system uses 12 positions per inch on the record cards 7 and the drill template 16. The hole used is $\frac{1}{16}''$. This is too small for the purposes of the overlays 24 which will, therefore, preferably, although not necessarily, use a pattern which is twice as large.

As a result, the minimum number of overlays is 4 each based on 2500 positions and having holes of, for example, $\frac{1}{8}''$ at a distance of 6 per inch. The four patterns will be staggered in relation to each other. In reality the printing of the terms may require so much room that to cover the entire vocabulary, a number of overlays of each of these four kinds will be required.

FIGURE 6 shows an example of such an overlay. It can be made by typing the terms on a blank overlay card and drilling the required holes in the overlay, for example, by means of the device of U.S. Patent No. 3,052,150 with a $\frac{1}{8}''$ diameter drill bit instead of the $\frac{1}{16}''$ drill bit. However, this would be a slow and costly process and would require the user to buy such a device.

FIGURE 7 shows the encoder partially in section complete with the backup plate 13b, an item record 7, the drill template 16 and an encoding overlay 24 as well as the drill 27.

It is also possible to utilize an encoder without light box 12. In that case the opening 13a will also be absent. The purpose of the light box is verification. After the drilling has been performed, the drilled holes show up as light spots, so that it will be easy to see whether the correct spots have been drilled.

The invention also provides a complete system for making the encoder overlays without the need for drilling holes in the same, using overlays with factory predrilled holes.

The system comprises first of all draft term assignment card 40, a sample of which is shown in FIGURE 8. These sheets are made of a stable transparent paper or transparent plastic, have the same shape and size as the item records and have a finish which will take pen or pencil writing. A grid 41 is printed on them, showing the overlay position and scales to read off their coordinates 2. Four different types of these sheets are required. The printing is a light color, such as yellow, which will not interfere with the legibility of the writing on the assignment card. An assignment is made by marking a hole position and writing the term next to it. All of the required spaces should be marked and some open spaces left behind each term so that there will be no confusion as to which hole and term belong together. For a hole spacing on the data records of 12 to the inch, the term assignment cards should have a spacing about twice as large to provide enough space for legible writing. Thus the card of FIGURE 8 would have ¼ × 10,000 = 2500 spaces. Within each of these spaces is a square of approximately ⅟₁₆ of an inch. An assignment is made by marking this square black.

In order to enable the user to make 10,000 term assignments, four different types of these term assignment cards are required, each having a ⅟₁₂ inch shift along the X or Y axis in relation to each other. Each corresponds to a matrix of 2500 holes. These will be referred to as matrix 1, 2, 3 and 4 respectively.

To make all of the assignments on matrix 1 will take a number of different sheets. To know which positions are still available, all holes assigned are drilled into a record card, the Consolidated Assignment Record, by means of the device of FIGURE 3. First the Consolidated Assignment Record is placed on the device; the term assignment sheet goes on top, and on top of that goes the drill template 16. Then the black spot on the term assignment sheet can be drilled.

The next assignments are then made after placing the new term assignment record in the device of FIGURE 3. The lighted holes will then indicate positions which have already been assigned.

The next step is the typing of the assigned terms on adhesive labels and cutting these to the correct length, mounting them on overlay sheets. Next the term assignment sheet goes to the computer programmer who may then enter the relationship between the term and their number into the computer.

ITEM RECORDS MARKED INSTEAD OF DRILLED

The previously described system is based on opaque item records in which a hole is drilled. These records could be made of paper but the use of plastic is preferred.

It is also possible to utilize paper records. In that case sufficiently transparent white paper will be used and opaque marks will be made on this paper. The logic of the scanner will then have to be changed to recognize opaque spots in a transparent field.

In that case, when entering data, the backup plate 13b in FIGURE 7 will have to be replaced by a plate without holes, and instead of the drill 27, a marking device will have to be used. A rotating pencil driven by an electric motor makes an excellent opaque mark.

For a record having 10,000 positions, excellent dimensional stability will be required. It is, therefore, part of the invention to use transparent plastic records which can be re-used after the ink or grease pencil markings have been washed off.

FIGURE 9 shows the preferred light sensor printed circuit board which is moved across the records or vice versa. The light sensors 44 are mounted on the board 43 with the same spacing as the hole pattern in the cards of FIGURE 1 and FIGURE 2. The light sensors 44 are soldered to the copper circuit wires etched on the board. The copper circuit wires 46 through 55 provide the input electrical connections to the light sensors 44. Each of the wires 46 through 55 connects to ten light sensors 44 through an isolating diode 45. Copper circuit wires 56 through 65 each connect to ten of the light sensors 44 and provide the output electrical connections.

FIGURE 10 is the schematic diagram of the light sensor 44 printed circuit board. The light sensors 44 are connected in a matrix array with lines 46 through 55 forming the input side of the array and lines 56 through 65 forming the output side of the array. This method of interconnection and the scanning techniques associated with it represent a significant advance in sequential types of scanners utilizing light sensors. Normally the maximum scanning frequency is determined by the frequency limitations of the light sensor utilized. Typically the light sensor's frequency limit is several orders of magnitude less than the drive and reading circuitry associated with it. The frequency limiting is a function of the rise and delay times associated with the light sensor. Accordingly the invention circumvents these limitations by sequentially exciting sub-groups of light sensors 44 and then scanning these sub-groups at the maximum operating frequency of the associated circuitry. The number of light sensors 44 in each sub-group is determined from the matrix array and includes all of the light sensors 44 in one line of the array. From this it can be seen that as the number of light sensors 44 becomes large, the maximum scanning frequency approaches that of the driving and reading circuitry and becomes relatively independent of the light sensors 44. The invention could be extended to excite all of the light sensors 44 simultaneously, thus requiring only one rise and delay period to scan all of the light sensors 44. This would require drive and reading circuitry for each light sensor and is, therefore, not suitable for large numbers of light sensors 44.

Accordingly the preferred embodiment of the invention utilizes a matrix type of interconnection to achieve a minimum amount of associated circuitry with an order of magnitude increase in scanning frequency.

The matrix is scanned by sequentially applying a positive scan signal to each of the input lines 46 through 55. Simultaneous with each positive scan signal, the output lines 56 through 65 are sequentially interrogated for the presence or absence of a positive voltage. The presence of a positive voltage denotes a light sensor 44 that is excited. The coordinates of each excited light sensor 44 are determined by noting which input line 46 through 55 and which output line 56 through 65 simultaneously have a positive voltage present. The first digit of the coordinate is the number associated with the input line 46 through 55 excited and the second digit is the number associated with the output line 56 through 65 excited.

FIGURE 11 is an isometric cutaway view of the invention showing the preferred mechanical embodiment. A card 1 is registered in the magazine 68 by the adjustable stop blocks 68a. The card 1 rests on a grid 68b containing all of the possible hole positions. The magazine 68 is mounted on a set of rails 70 by ball bushings 71. The rails 70 are affixed to a frame 69 for support. In the preferred embodiment of the invention, the magazine is driven by a step motor 75 through a gear train 74 affixed to a lead screw 73. The rotational motion of the lead screw 73 is converted to linear motion by a ball nut 72 affixed to the magazine 68 and running on the lead screw 73. Connected to the step motor 75 is an electrical commutator 76. This commutator 76 provides an electrical signal corresponding to the position of the card 1 with respect to the row of light sensors 44. The movement of the card 1 across the light sensors 44 provides one axis of the scan. Placed directly above the plane of the magazine 68 is a light source 67. The light source 67 provides the excitation for the light sensors 44. A collimating mask 66 is placed between the light sensors 44 and the base grid 68b of the magazine 68. This mask 66 eliminates optical cross talk and makes a collimated light source 67 unnecessary. In operation the card 1 is passed between the light source 67 and the row of light sensors 44 one row at a time. The coordination of each hole occurring in the row is then determined by electronically interrogating the row of light sensors 44. The presence of a hole at a particular location allows the light sensor 44 associated with that location to be excited by the light source 67. The absence of a particular hole prevents the light sensor 44 associated with that location from being excited by the light source 67.

FIGURE 12 shows the electronic block diagram of the system. The object of this system is to provide the necessary logic and scanning signals to scan the light sensors 44 and provide the control functions for the output device. The output device can be any one of the well-known tab card punches, paper tape punches, magnetic tape units or computer outputs such as high speed printers. The input to the readout device is taken directly from the electrical commutator 76 for one axis of the scan and from the scan lines 46 through 55 and 77 through 86 for the other axis. The necessary interface and buffering systems are assumed to be part of the readout device and for simplicity are not shown. These devices and their interface systems are all well-known in the state of the art, and no claim is laid thereto.

The heart of the system is a pair of decade counters connected to provide a sequence of 100 outputs. The preferred embodiment of the invention uses magnetron beam switching tubes for the decade counters but any suitable semiconductor or vacuum tube circuitry could be used, and such devices are well-known in the state of the art and no claim is laid thereto. The tens decade counter, FIGURE 12 item 99 sequentially selects sub-groups of ten light sensors 44 by supplying positive scan signal to one of the light sensor 44 matrix input lines 46 through 55. The units decade counter 98 then sequentially interrogates each light sensor 44 of the selected group. This interrogation is accomplished by sequentially comparing the output of each light sensor 44 of the selected group with the outputs of the units decade counter 98 by means of ten two-terminal and gates 106 through 115. Those light sensors 44 of the selected group that are excited supply a positive signal to an input of their associated and gates 106 through 115. Those light sensors 44 of the selected group that are unexcited supply a zero signal to the input of their associated and gates 106 through 115. The output of each and gate 106 through 115 is connected to a ten input or gate 100. Since only one and gate is interrogated at a time, the or gate 100 serves to serialize the light sensor 44 outputs. The output of or gate 100 is fed to a Schmidt trigger 101 which serves as a threshold detector by rejecting those light sensor 44 outputs below a preset voltage level.

Having described separately certain portions of the invention, referring to FIGURE 12, a typical operating cycle will now be described to show the relationship of each part or function to the whole of the invention.

The initial conditions are as follows: The decade counters 98 and 99 are set to zero. The flip flops 89, 90, 91, 92 and 94 are in a reset condition and have a zero output. The system clock 87, an astable multivibrator, is running and applying the clock signal to the #1 input of and gate 88. And gate 88 is closed because of a zero signal from flip flop 94 on input #2, thus the system is in a quiescent or standby condition. Or gate 124 is the system start or gate and can receive an impulse from lines 119, 120 or 121. Line 119 is the manual initiation input and is connected to the manual start switch generally located on the control console. Line 120 is connected to the output device and serves to restart the scan after the previous output has been recorded. Line 121 is connected to the mechanical scan servo system and serves to restart the electronic scan system after each row is positioned over the light sensor 44. The system is activated by setting flip flop 94 to the 1 state through or gate 124. This applies the clock 87 signal to flip flop 89 by enabling and gate 88. The one output of flip flop 89 drives the units decade counter 98 through flip flops 90 and 91. The zero output of flip flop 89 drives the #2 input of and gate 93 through flip flop 92. The #1 input of and gate 93 comes from Schmidt trigger 101. Flip flop 92 and and gate 93 serve to strobe the output of Schmidt trigger 101. The strobe effect prevents the decade counter switching transients from actuating the readout device and causing a false output. The output of and gate 93 serves two purposes. First it supplies a start impulse for the readout device on line 117. Second it stops the system scan by resetting flip flop 94 through or gate 95 and and gate 96. In those applications where a simple count of the total number of holes is required, and gate 96 can be disabled by line 118, thus allowing the system to scan at its maximum rate. This is possible because the speed of present day electronic totalizing counters exceeds the scan speed of the invention. When the row of light sensors 44 have been completely scanned, the 99 carry pulse resets flip flop 94 through or gate 95 and provides a signal on line 116 that causes the servo system to position the next row of holes above the light sensors 44. When the servo system has finished positioning the next row of holes, it provides a start signal on lines 121 and the whole sequence of operation is repeated.

The invention likewise includes special modifications of the encoder of FIGURES 3, 4 and 7, shown in FIGURES 13 and 14. To provide more convenient positioning of the drill, the drillbit 32 is surrounded by a shroud 130 which slides along guides 131 and can be pushed back against the pressure of springs 132. The backup plate 134 is made of a fairly hard material such as Plexiglass.

Using a twistdrill as shown in FIGURE 13 works well if the record 7 is made of plastic or some other fairly substantial material. However, when record 7 is made of paper, a hollow paper drill 133 as shown in FIGURE 14, should be used. The hollow drill 133 goes through the hollow armature so that the chips will come out at that end. In this case the backup 134 is made of some soft yielding material like cork or rubber.

The invention is not limited to the examples and modifications described herein, but encompasses all modifications contained within the claims.

What we claim is:

1. An automatic records scanner comprising a records holder adapted for the accurate superimposition of records, a row of light sensors on one side of said records holder, a light source positioned in a cooperating manner opposite said row of light sensors on the other side of said records holder, and a servo mechanism adapted to move said records holder relative to said light source and light sensors; an electronic scan circuit which sequentially scans said light sensors, and an electronic circuit which translates the relative position of (a) said records holder and (b) said light source and sensors, as well as the scan-sequence condition of said electronic scan circuit, into a position code, an interlock circuit which stops the scan action of said electronic scan circuit when one of said light sensors is activated and feeds the position code into a data processing system and releases the said scan circuit again after said data have been entered in said system, and a further interlock circuit which activates said servo mechanism to provide movement over a discrete distance upon completion of each cycle of the electronic scan.

2. An automatic records scanner comprising a records holder adapted for the accurate superimposition of records, a row of light sensors on one side of said records holder, a light source positioned in a cooperating manner opposite said row of light sensors on the other side of said records holder, and a servo mechanism adapted to move said records holder relative to said light source and light sensors; an electronic scanning circuit which scans said light sensors, an electronic circuit which translates the relative position of (a) said records holder and (b) said light source and sensors, as well as the condition of said scanning circuit, into a position code; said light sensors being divided into groups, excitation circuitry to excite all of the light sensors within a group simultaneously, said scanning circuit operating to scan each of the light sensors within a group sequentially for the presence or absence of a light induced signal, and circuitry to switch said excitation circuitry and said scanning circuit from one of said groups to the next.

(References on following page)

References Cited

UNITED STATES PATENTS

| | | | |
|---|---|---|---|
| 3,200,240 | 8/1965 | Hammel | 235—61.11 |
| 3,247,362 | 4/1966 | Park et al. | 235—61.11 |
| 3,317,712 | 5/1967 | Silverman | 235—61.11 |
| 3,341,692 | 9/1967 | Lee | 235—61.11 |
| 3,100,296 | 8/1963 | Jonker | 235—61.11 X |

DARYL W. COOK, Primary Examiner

U.S. Cl. X.R.

250—219, 208